(12) United States Patent
Basil et al.

(10) Patent No.: US 6,264,859 B1
(45) Date of Patent: *Jul. 24, 2001

(54) OPTICALLY TRANSPARENT UV-PROTECTIVE COATINGS

(75) Inventors: John D. Basil, Pittsburgh; Robert M. Hunia, Kittanning; Chia-Cheng Lin, Allison Park, all of PA (US)

(73) Assignee: PPG Industries Ohio, Inc., Cleveland, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/048,866

(22) Filed: Apr. 14, 1993

Related U.S. Application Data

(63) Continuation-in-part of application No. 07/300,663, filed on Jan. 23, 1989, now abandoned, which is a continuation-in-part of application No. 06/914,857, filed on Oct. 3, 1986, now Pat. No. 4,799,963.

(51) Int. Cl.$^7$ ................................. F21V 9/04; C07G 1/00
(52) U.S. Cl. .................... 252/588; 252/589; 106/287.13; 106/287.14; 106/287.15; 106/287.16; 106/287.18
(58) Field of Search ....................... 106/287.13, 287.14, 106/287.15, 287.16, 287.18; 252/582, 588, 589

(56) References Cited

U.S. PATENT DOCUMENTS

| | | |
|---|---|---|
| 2,964,427 | 12/1960 | Rheinberger et al. . |
| 3,004,863 | 10/1961 | Gray, Jr. et al. . |
| 3,433,750 | 3/1969 | Fain et al. . |
| 3,582,395 | 6/1971 | Adams et al. . |
| 3,726,698 | 4/1973 | Hares et al. . |
| 3,941,719 | 3/1976 | Yoldas . |
| 3,944,658 | 3/1976 | Yoldas . |
| 3,986,997 | 10/1976 | Clark . |
| 4,027,073 | 5/1977 | Clark . |
| 4,043,953 | 8/1977 | Chang et al. . |
| 4,181,687 | 1/1980 | Ward et al. . |
| 4,208,475 | 6/1980 | Paruso et al. . |
| 4,242,403 | 12/1980 | Mattimoe et al. . |
| 4,244,986 | 1/1981 | Paruso et al. . |
| 4,271,210 | 6/1981 | Yoldas . |
| 4,275,118 | 6/1981 | Baney et al. . |
| 4,278,632 | 7/1981 | Yoldas . |
| 4,286,024 | 8/1981 | Yoldas . |
| 4,293,594 | 10/1981 | Yoldas et al. . |
| 4,346,131 | 8/1982 | Yoldas . |
| 4,357,427 | 11/1982 | Ho et al. . |
| 4,390,373 | 6/1983 | White et al. . |
| 4,405,679 * | 9/1983 | Fujioka et al. ..................... 428/216 |
| 4,434,103 | 2/1984 | Interrante . |
| 4,442,168 | 4/1984 | White et al. . |
| 4,477,499 | 10/1984 | Doin et al. . |
| 4,500,669 | 2/1985 | Ashlock et al. . |
| 4,505,974 | 3/1985 | Hosler . |
| 4,546,018 | 10/1985 | Ryuzo et al. . |
| 4,560,784 | 12/1985 | Mori et al. . |
| 4,568,578 | 2/1986 | Arfsten et al. . |
| 4,571,365 | 2/1986 | Ashlock et al. . |
| 4,799,963 * | 1/1989 | Basil et al. ..................... 106/287.13 |

FOREIGN PATENT DOCUMENTS

| | | |
|---|---|---|
| 65 457 | 11/1969 | (DE) . |
| 1795673 | 2/1973 | (DE) . |
| 0 009 947 | 4/1980 | (EP) . |
| 84303605 | 12/1984 | (EP) . |
| 85110293 | 2/1986 | (EP) . |
| 0 233 355 | 8/1987 | (EP) . |
| 728751 | 4/1955 | (GB) . |
| 1107295 | 3/1968 | (GB) . |
| 1494209 | 12/1977 | (GB) . |
| 77-80037 | 7/1977 | (JP) . |
| 54-91865 | 11/1979 | (JP) . |
| 81-78477 | 9/1981 | (JP) . |
| 61-034504 | 2/1986 | (JP) . |
| 86-116628 | 3/1986 | (JP) . |
| 679648 | 8/1979 | (SU) . |

OTHER PUBLICATIONS

Schroeder, Physics of Thin Films, vol. 5, pp. 134–139, (1969).*
"Oxide Layers Deposited From Organic Solutions", H. Schroeder, *Physics of Thin Films,* vol. 5, G. Haas and R. E. Thun, eds. Ch.3. Academic Press, 1969.
"Inhibition of Photoinitiated Degradation of Polycarbonate by Cerium (III) Overcoating" *Journal of Applied Polymer Science,* vol. 26, A. J. Klein, H. Yu, and W. M. Yen, (1969).
*Journal of Non–Crystalline Solids,* vol. 63 (1984).
*Polymer Bulletin,* No. 14 (1985).
Chemical Abstracts, vol. 97 No. 16, Jan. 16, 1982, p. 638, Abstract No. 136682j. Columbus, Ohio.

* cited by examiner

Primary Examiner—Philip Tucker
(74) Attorney, Agent, or Firm—Kenneth J. Stachel

(57) ABSTRACT

An ultraviolet radiation resistant coating is disclosed comprising cerium oxide in an inorganic oxide matrix formed by the hydrolysis and condensation of an organoalkoxysilane and/or other metal alkoxide in combination with the reaction product of cerium oxide and tetraalkylsilicate.

9 Claims, No Drawings

OPTICALLY TRANSPARENT UV-PROTECTIVE COATINGS

CROSS REFERENCE TO RELATED APPLICATIONS

This application is a continuation-in-part of U.S. application Ser. No. 07/300,663 filed Jan. 23, 1989 now abandoned, which in turn is a continuation-in-part of U.S. application Ser. No. 06/914,857 filed Oct. 3, 1986, now U.S. Pat. No. 4,799,963.

FIELD OF THE INVENTION

The present invention relates generally to protective coatings for plastics such as polycarbonate, and more particularly to coatings which protect the underlying substrate from damage caused by exposure to ultraviolet radiation.

BACKGROUND OF THE INVENTION

U.S. Pat. No. 4,275,118 to Baney et al discloses a coating composition comprising an acidic dispersion of colloidal titania, colloidal silica and hydroxylated silsesquioxane in an alcohol-water medium which produces a hard, abrasion-resistant coating when cured on a plastic surface such as polycarbonate.

U.S. Pat. No. 4,390,373 and 4,442,168 to White et al disclose a cured transparent, abrasion resistant coating composition comprising an effective abrasion resisting amount of colloidal dispersion containing colloidal antimony oxide and colloidal silica in a weight rate of less than or equal to about 30:70 in a water-alcohol solution of the partial condensate of $R(Si(OH)_3)$ wherein R is an organic radical.

U.S. Pat. No. 4,405,679 to Fujioka et al discloses a coated shaped article of a polycarbonate type resin of improved abrasion resistance comprising a shaped polycarbonate substrate, an undercoat applied and cured on the substrate, and an overcoat applied and cured on the undercoat comprising a hydrolyzate of an epoxy-containing silicon compound, at least one member of the group of hydrolyzates or organic silicon compounds, colloidal silica and organic titania compounds, and a curing catalyst.

U.S. Pat. No. 4,477,499 to Doin et al discloses ultraviolet radiation resistant silicone resin coatings having improved thermoformability and shortened required aging achieved by the addition of a Lewis acid compound to the coating composition.

U.S. Pat. Nos. 4,500,669 and 4,571,365 to Ashlock et al disclose transparent, abrasion resistant coating compositions comprising a colloidal dispersion of a water insoluble dispersant in a water-alcohol solution of the partial condensate of silanol wherein the dispersant comprises metals, alloys, salts, oxides and hydroxides thereof.

European Patent Application No. 851102939 published May 2, 1986 entitled "Carbon-Containing Monolithic Glasses Prepared by a Sol-Gel Process" by Baney et al of Dow Corning Corporation discloses a valuable intermediate which comprises a dispersion of a colloidal metal oxide in a water-alcohol solution of the partial condensate of a silanol having the formula $RSi(OH)_3$, wherein the metal oxide is $ZrO_2$, $SnO_2$, $ZrSiO_4$, $B_2O_3$ or $La_2O_3$.

Optical quality abrasion resistant coated plastic materials generally require a coating that protects the substrate from the damaging effects of ultraviolet (UV) radiation. Protection from ultraviolet radiation is especially important for polycarbonate, since hydrolytic degradation is apparently accelerated by UV exposure. Conventional UV stabilizers do not impart sufficient protective capacity to abrasion resistant coatings, as sufficient amounts of most typical organic UV absorbers cannot be added to abrasion resistant coatings without adversely affecting hardness and adhesion of the coating. Moreover, typical UV absorbers may gradually become deactivated after prolonged exposure, and also may gradually be leached from the composition.

In *Physics of Thin Films*, Vol. 5, in "Oxide Layers Deposited From Organic Solutions", Schroeder notes that titanium, cerium, antimony, and lead oxides deposited from organic solutions exhibit a steep rise of absorption in the near ultraviolet range of the radiation spectrum, and in the *Journal of Applied Polymer Science*, Vol. 26, in "Inhibition of Photoinitiated Degradation of Polycarbonate by Cerium (III) Overcoating," Klein et al disclose coating a polycarbonate substrate with cerous chloride ($CeCl_3$)/poly(vinyl alcohol) complex.

SUMMARY OF THE INVENTION

The present invention provides protection for underlying plastic substrates such as polycarbonate from damaging ultraviolet radiation by means of transparent coatings containing cerium oxide, a stable strongly ultraviolet absorbing species. The transparent cerium oxide containing UV protective coatings of the present invention are formed from aqueous sols containing colloidal cerium oxide in additional to alkoxides of silicon and/or other metals which hydrolyze and polymerize by condensation to form a film in which the cerium is incorporated in the oxide network of the coating.

DESCRIPTION OF THE PREFERRED EMBODIMENT

Coatings that protect plastic substrates such as polycarbonate from damage caused by ultraviolet radiation are formed from aqueous sols containing cerium oxide and a network-forming metal alkoxide such as alkoxysilanes and other metal alkoxides. The alkoxysilane may be an organoalkoxysilane, such as an alkylalkoxysilane or organofunctional alkoxysilane. The alkoxide may contain alkyl or aryl groups and may be in dimer or higher condensed form so long as hydrolyzable alkoxide groups remain. The cerium oxide is preferably prereacted with a tetraalkylsilicate, preferably tetraethylorthosilicate, TEOS. Hydrolysis and condensation polymerization occur in situ. Alternatively, the alkoxide may be partially or fully hydrolyzed, and condensed to some extent prior to combination with the cerium oxide sol.

The resulting silane/ceria sol may be used as a coating composition for either a primer or protective overcoat on a substrate or coated substrate. Or, the silane/ceria sol may be added to other coating compositions to increase their resistance to ultraviolet radiation. In either case, the coating compositions may be applied by any conventional technique, such as spraying, dipping or flow coating. The composition dries and cures to form a uniform durable coating with good adhesion to plastic substrates such as polycarbonate. The coating protects the substrate from ultraviolet radiation by providing a strong, broad absorption band in the 240 to 280 nanometer range.

In a preferred embodiment of the present invention, an alkoxide is partially hydrolyzed before adding an aqueous sol of the reaction product of tetraalkylsilicate and cerium oxide. Preferably, the alkoxide is an alkoxide of the general formula $R_xM(OR')_{z-x}$ where R is an organic radical, M is selected from the group consisting of silicon, aluminum, titanium, zirconium and mixtures thereof, R' is selected from the group consisting of low molecular weight alkyl radicals, z is the valence of M, and x is less than z and may be zero except when M is silicon. The organic radical of R is preferably alkyl, vinyl, methoxyethyl, phenyl, γ-glycidoxypropyl, or γ-methacryloxypropyl. The alkoxide hydrolyzes according to the general reaction for preferred organoalkoxysilanes

Concensation of the hydrolyzed alkoxide proceeds according to the general reactions

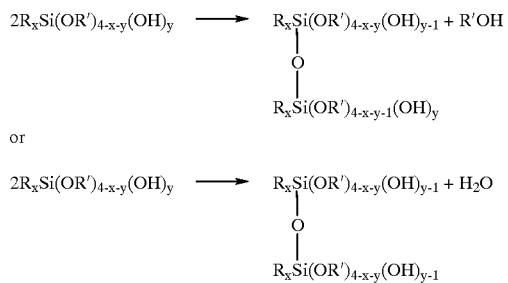

Further hydrolysis and condensation follow.

The pH and/or degree of condensation of the alkoxides may be adjusted, if necessary, to prevent haze or precipitation upon mixing with the ceria sol. The cerium oxide sol preferably comprises about 10 to 30 percent by weight colloidal cerium oxide in water, with the colloidal cerium oxide particle size sufficiently small to minimize scattering of visible light, preferably less than 30 to 40 nanometers, most preferably less than 10 nanometers. Alkoxides of titanium, aluminum and/or zirconium may also be included in compositions of the present invention, as well as colloidal silica for abrasion resistance. The ultraviolet radiation protection provided by the cerium oxide containing coating of the present invention may be determined by measuring the UV absorbance spectrum of the coating applied on a quartz substrate.

The present invention will be further understood from the description of a specific example which follows.

EXAMPLE

A reaction mixture comprising 200 grams of tetraethylorthosilicate and 200 grams of cerium oxide is stirred for 4 hours at room temperature. The pH is increased from 2.2 to 3.6 and 300 grams of deionized water is added. To this reaction product is added 500 grams of methyl triethoxysilane and 50 grams of dimethyl diethoxysilane. After stirring for 3 days at room temperature, 2.8 grams of sodium acetate is added and the sol is diluted with 250 grams of isopropanol and stirred for an additional 30 minutes.

Unprimed stretched acrylic substrates are dipped in the above sol for 5 minutes, dried in air for 5 minutes, and cured at 80° C. for at least 2 hours. The coating is stable in QUV-B testing for 300 hours and has a Bayer abrasion resistance (percent haze after 300 cycles) of 5 to 10. In solvent crazing tests under load of 2000 pounds per square inch, a coating 2 to 2.5 microns thick is resistant to acetone for 4 minutes and to concentrated sulfuric acid for 14 minutes.

Various modifications of the composition and reaction conditions are within the scope of the present invention which is defined by the following claims.

What is claimed is:

1. An optically transparent coating composition which reduces transmission of ultraviolet radiation consisting essentially of:

a. a partially hydrolyzed alkoxide comprised of the general formula $R_xSi(OR')_{z-x}$ wherein R is an organic radical and R' is selected from the group consisting of methyl, ethyl, propyl, and butyl and z is the valence of Si, and x is less than z; and b. the reaction product of tetraalkylsilicate and cerium oxide formed from combining tetraalkylsilicate and cerium oxide, increasing the pH, and adding water.

2. A composition according to claim 1 wherein R is selected from the group consisting of alkyl, vinyl, phenyl, methoxyethyl, γ-glycidoxypropyl and γ-methacryloxypropyl, and x is 1.

3. A composition according to claim 2, wherein said alkoxide comprises methyl triethoxysilane.

4. A composition according to claim 2, wherein said alkoxide comprises γ-glycidoxypropyl trimethoxysilane.

5. An optically transparent coating composition which reduces transmission of ultraviolet radiation consisting essentially of:

a. a partially hydrolyzed alkoxide of the general formula $R_xM(OR')_{z-x}$ wherein R is an organic radical, M is selected from the group consisting of silicon, aluminum, titanium, zirconium and mixtures thereof, R' is a low molecular weight alkyl radical, z is the valence of M, and x is less than z and may be zero except when M is silicon; and b. the reaction product of tetraalkylsilicate and cerium oxide formed from combining tetraalkylsilicate and cerium oxide, increasing the pH, and adding water, wherein said cerium oxide comprises colloidal particles in aqueous dispersion.

6. A composition according to claim 5, wherein said particles have an average particle size of less than 10 nanometers.

7. An optically transparent coating composition which reduces transmission of ultraviolet radiation consisting essentially of:

a. a partially hydrolyzed alkoxide of the general formula $R_xM(OR')_{z-x}$ wherein R is an organic radical, M is selected from the group consisting of silicon, aluminum, titanium, zirconium and mixtures thereof, R' is a low molecular weight alkyl radical, z is the valence of M, and x is less than z and may be zero except when M is silicon;

b. the reaction product of tetraalkylsilicate and cerium oxide formed from combining tetraalkylsilicate and cerium oxide, increasing the pH, and adding water; and c. silica.

8. A composition according to claim 7, wherein said silica comprises colloidal particles in aqueous dispersion.

9. A composition according to claim 8, wherein said silica particles have an average particle size of 10 to 20 nanometers.

* * * * *